United States Patent Office 3,245,911
Patented Apr. 12, 1966

3,245,911
Ni-Mn-Al-Co-FERRITE
Avénir Vassiliev, Jean Nicolas, and Mieczyslaw Hildebrandt, all of Paris, France, assignors to Compagnie Generale de Telegraphie sans Fil, a corporation of France
No Drawing. Filed Dec. 4, 1961, Ser. No. 156,927
Claims priority, application France, Dec. 13, 1960, 846,744
3 Claims. (Cl. 252—62.5)

The present invention relates to ferrites used in electromagnetic microwave transmission systems. More particularly it relates to ferrite used in so-called resonance-isolator devices and which are in the shape of flat pieces positioned against the large wall of rectangular waveguides building up such devices.

It is known that, when the saturation moment of the ferrite is high, the field necessary for a resonance isolator is also high. At high powers, in microwave ranges, ferrites having a high saturation moment are generally used, such as Ni-, Co- and Mn-ferrites.

The production of such a high field requires the use of very bulky, heavy, and highly uneconomical magnets. In certain applications, it would be desirable to reduce the saturation moment of these ferrites without, however, affecting in any significant degree their other characteristics.

According to the invention, this effect is obtained by providing a ferrite material corresponding to the following formula:

$x$NiO, $y$CoO, $z$MnO$_2$, $v$Fe$_2$O$_3$, $w$Al$_2$O$_3$, where:

$x$ = 49–50 moles
$y$ = 1.2–1.6 moles
$z$ = 0.8–1.2 moles
$v$ = 46–41 moles
$w$ = 3–7 moles The two preferred compositions correspond, respectively, to (1)
$x$ = 49.4 moles
$y$ = 1.4 moles
$z$ = 1 mole
$v$ = 45.1 moles
$w$ = 3.1 moles (2)
$x$ = 49.4 moles
$y$ = 1.4 moles
$z$ = 1 mole
$v$ = 42 moles
$w$ = 6.2 moles The invention will be described in connection with the following examples:

*Example 1*

Following mixtures are first prepared:

(a)

|  | G. |
|---|---|
| Fe$_2$O$_3$ | 67 |
| NiO (pure) | 33 |

(b)

|  | G. |
|---|---|
| Fe$_2$O$_3$ | 60.6 |
| CoO | 33.68 |
| MnO$_2$ | 0.96 |

(c)

270 g. of mixture (a)
30 g. of mixture (b)
2.06 g. of MnO$_2$ (d)

|  | G. |
|---|---|
| AlO$_3$ | 28.25 |
| NiO | 21.75 |

All these mixtures are finely crushed with distilled water and calcined at a temperature of 950° C., during two hours. The following composition is then prepared, from mixtures corresponding to above Formula 1

|  | G. |
|---|---|
| Mixture (a) | 213.6 |
| Mixture (c) | 71.4 |
| Mixture (d) | 15 |
| MnO$_2$ | 1.64 |

This composition is finely crushed with distilled water, dried and transformed into granules by adding a known binding agent containing polyvinyl alcohol.

The samples are compressed at 1$T$/cm.$^2$ and the pieces are sintered at a temperature of 1300° C. during two hours; cooling is then effected at the rate of 50° C./hour.

*Example 2*

The same method as in Example 1 is used, the composition being formulated as follows (2):

|  | G. |
|---|---|
| Mixture (a) | 202.5 |
| Mixture (c) | 67.5 |
| Mixture (d) | 30 |
| MnO$_2$ | 1.55 |

The characteristics of the products obtained in the two examples are listed in the follownig table, where they are compared with those of a conventional ferrite composition:

|  | Conventional ferrite | Formula (1) Example (1) | Formula (2) Example (2) |
|---|---|---|---|
| Maximum induction $B_m$ at 25 oersted, (in gauss) | 1,900 | 1,500 | 900 |
| Remanent induction $B_r$ (gauss) | 1,100 | 700 | 400 |
| Coercive field $H_c$ (oersted) | 8 | 8 | 8 |
| Specific gravity (g./cm$^3$) | 5 | 5 | 4.7 |
| Resistivity (megohm/cm.) | 1 | 100 | 500 |
| Dielectric constant (at 1 mc./s.) |  | 14 | 14 |
| Tangent of the loss angle (tg) at (1 mc./s.) |  | 100.10$^{-3}$ | 100.10$^{-3}$ |
| Dielectric constant (at 10 mc./s.) | 15 | 11 | 11 |
| Tangent of the loss angle (at 10 mc./s.) | 100.10$^{-3}$ | 30.10$^{-3}$ | 20.10$^{-3}$ |
| Saturation moment, 4 $Js$/cm.$^3$ at 20° C. (in E.M.U., C.G.S.) | 3,200 | 2,600 | 2,000 |

It is seen that the saturation moment decreases considerably when the Al-contents increases.

On the other hand, the width of the resonance line, measured at 9000 mc./s., is:

500 oersted for the conventional ferrite
500 oersted for the composition (1)
500 oersted for the composition (2)

i.e., the same for all three compositions.

It is to be understood that the details of this method described hereinabove are not limitative. It is, however, desirable to proceed by preparing separate mixtures, as indicated. It is possible, in this manner, to adjust more accurately the proportions of the constituents, the resulting product being more homogeneous.

What is claimed is:

1. A ferrite composition having the following formula $x$NiO, $y$CoO, $z$MnO$_2$, $v$Fe$_2$O$_3$, $w$Al$_2$O$_3$, where:

$x$=49–50 moles
$y$=1.2–1.6 moles
$z$=0.8–1.2 moles
$v$=46–41 moles
$w$=3–7 moles 2. A ferrite composition according to claim 1 in which
$x$=49.4 moles
$y$=1.4 moles
$z$=1 mole
$v$=45.1 moles
$w$=3.1 moles 3. A ferrite composition according to claim 1 in which
$x$=49.4 moles
$y$=1.4 moles
$z$=1 mole
$v$=42 moles
$w$=6.22 moles

References Cited by the Examiner
UNITED STATES PATENTS

| | | | |
|---|---|---|---|
| 2,723,239 | 11/1955 | Harvey | 252—62.5 |
| 2,982,731 | 5/1961 | Baird et al. | 252—62.5 |
| 3,015,788 | 1/1962 | Sirvetz | 252—62.5 |

TOBIAS E. LEVOW, *Primary Examiner.*

JOSEPH R. LIBERMAN, MAURICE A. BRINDISI,
*Examiners.*